United States Patent
Salles

(10) Patent No.: US 11,349,903 B2
(45) Date of Patent: May 31, 2022

(54) VEHICLE DATA OFFLOADING SYSTEMS AND METHODS

(71) Applicant: Toyota Motor North America, Inc., Plano, TX (US)

(72) Inventor: Felipe G. Salles, Garland, TX (US)

(73) Assignee: TOYOTA MOTOR NORTH AMERICA, INC., Plano, TX (US)

(*) Notice: Subject to any disclaimer, the term of this patent is extended or adjusted under 35 U.S.C. 154(b) by 42 days.

(21) Appl. No.: 16/175,313

(22) Filed: Oct. 30, 2018

(65) Prior Publication Data
US 2020/0137142 A1 Apr. 30, 2020

(51) Int. Cl.
| | |
|---|---|
| H04L 29/08 | (2006.01) |
| H04W 4/44 | (2018.01) |
| G08G 1/04 | (2006.01) |
| G06K 9/00 | (2022.01) |
| G08G 1/015 | (2006.01) |
| H04L 15/16 | (2006.01) |
| G06F 15/16 | (2006.01) |
| H04L 67/06 | (2022.01) |
| H04L 67/10 | (2022.01) |
| H04W 84/12 | (2009.01) |
| G06N 20/00 | (2019.01) |

(52) U.S. Cl.
CPC .............. *H04L 67/06* (2013.01); *H04L 67/10* (2013.01); *H04W 4/44* (2018.02); *G06N 20/00* (2019.01); *H04W 84/12* (2013.01)

(58) Field of Classification Search
CPC ........ F28D 7/1638; F28D 7/08; F28D 7/0075; F28D 7/005; F28D 7/06; F28F 9/26; F28F 21/081; F28F 2275/06; F28F 21/082; F28F 2265/26; H04L 67/06; H04L 67/10; H04W 4/44; H04W 84/12; G06N 20/00
USPC ........................................................ 709/217
See application file for complete search history.

(56) References Cited

U.S. PATENT DOCUMENTS

| | | | |
|---|---|---|---|
| 5,712,782 A | 1/1998 | Weigelt et al. | |
| 6,122,580 A * | 9/2000 | Autermann | B60R 25/24 |
| | | | 701/29.6 |

(Continued)

FOREIGN PATENT DOCUMENTS

| | | |
|---|---|---|
| CN | 106557085 | 4/2017 |
| CN | 108087104 | 5/2018 |

(Continued)

OTHER PUBLICATIONS

Johannes Pillmann; Benjamin Sliwa; Jens Schmutzler; Christoph Ide; and Christian Wietfeld, Car-To-Cloud Communication Tiaffic Analysis Based On The Common Vehicle Information Model, Published in: Vehicular Technology Conference (VTC Spring), 2017 IEEE 85th, 5 pages.

*Primary Examiner* — David R Lazaro
*Assistant Examiner* — Berhanu Shitayewoldetadik
(74) *Attorney, Agent, or Firm* — Dinsmore & Shohl LLP

(57) ABSTRACT

A method for offloading vehicle data from a vehicle includes detecting and capturing a first set of data points with a group of sensors mounted on a vehicle, processing and analyzing, with a vehicle processor, the data points, determining whether the data points are to be offloaded from the vehicle or stored in the vehicle, and upon determination that the data points are to be offloaded from the vehicle, determining when to offload the vehicle data from the vehicle.

22 Claims, 6 Drawing Sheets

(56) References Cited

U.S. PATENT DOCUMENTS

| | | | |
|---|---|---|---|
| 8,560,165 B2 | 10/2013 | Salman et al. | |
| 9,227,568 B1* | 1/2016 | Hubbell | B60R 1/06 |
| 9,285,230 B1* | 3/2016 | Silver | G06V 20/588 |
| 9,836,062 B1* | 12/2017 | Hayward | G01S 19/47 |
| 10,306,430 B1* | 5/2019 | Abari | G05D 1/0088 |
| 10,366,289 B2* | 7/2019 | Puttagunta | G05B 15/02 |
| 10,375,174 B2* | 8/2019 | Haidar | H04L 67/10 |
| 10,377,039 B1* | 8/2019 | Gennis | B25J 9/1656 |
| 10,518,791 B2* | 12/2019 | Singh | G06K 9/6218 |
| 2005/0027403 A1* | 2/2005 | Nagai | G01D 3/032 |
| | | | 701/1 |
| 2007/0135980 A1* | 6/2007 | Plante | G07C 5/08 |
| | | | 701/33.4 |
| 2008/0082345 A1* | 4/2008 | Greiner | G06Q 10/20 |
| | | | 705/305 |
| 2011/0295655 A1 | 12/2011 | Tsuji et al. | |
| 2012/0110356 A1* | 5/2012 | Yousefi | G06F 1/26 |
| | | | 713/320 |
| 2013/0202197 A1* | 8/2013 | Reeler | G06V 20/64 |
| | | | 382/154 |
| 2013/0329666 A1* | 12/2013 | Degani | H04W 72/08 |
| | | | 370/329 |
| 2014/0094992 A1* | 4/2014 | Lambert | G07C 5/008 |
| | | | 701/1 |
| 2014/0257592 A1* | 9/2014 | Fernandes | B60W 40/09 |
| | | | 701/1 |
| 2014/0270476 A1* | 9/2014 | Cameron | G06V 20/64 |
| | | | 382/154 |
| 2015/0025917 A1* | 1/2015 | Stempora | G06Q 40/08 |
| | | | 705/4 |
| 2015/0092540 A1* | 4/2015 | Choudhary | H04W 28/0289 |
| | | | 370/230 |
| 2015/0175168 A1* | 6/2015 | Hoye | G07C 5/008 |
| | | | 434/64 |
| 2015/0244826 A1* | 8/2015 | Stenneth | H04L 67/322 |
| | | | 709/213 |
| 2015/0294363 A1* | 10/2015 | Bhola et al. | G06Q 30/0266 |
| | | | 705/14.63 |
| 2015/0336578 A1* | 11/2015 | Lord | B60W 30/09 |
| | | | 701/2 |
| 2016/0028824 A1* | 1/2016 | Stenneth | H04L 67/42 |
| | | | 709/219 |
| 2016/0197800 A1* | 7/2016 | Hui | H04L 41/0816 |
| | | | 370/252 |
| 2016/0203652 A1* | 7/2016 | Throop | G07C 5/008 |
| | | | 701/1 |
| 2016/0223643 A1* | 8/2016 | Li | G01S 13/345 |
| 2016/0295089 A1* | 10/2016 | Farahani | G07C 5/008 |
| 2016/0311298 A1* | 10/2016 | Tokhy | B60J 11/02 |
| 2016/0381019 A1* | 12/2016 | Modi | H04L 67/1034 |
| | | | 726/4 |
| 2017/0011465 A1* | 1/2017 | Anastassov | G06Q 40/08 |
| 2017/0078922 A1* | 3/2017 | Raleigh | H04W 28/10 |
| 2017/0092018 A1* | 3/2017 | Throop | G07C 5/008 |
| 2017/0106885 A1* | 4/2017 | Singh | H04N 5/247 |
| 2017/0163716 A1 | 6/2017 | Jang et al. | |
| 2017/0200333 A1* | 7/2017 | Plante | G06Q 40/08 |
| 2017/0213222 A1* | 7/2017 | Rajpathak | G06F 40/216 |
| 2017/0228258 A1* | 8/2017 | Shifman | H04L 67/10 |
| 2017/0270361 A1* | 9/2017 | Puttagunta | G06V 20/56 |
| 2017/0294054 A1 | 10/2017 | Rosenbaum | |
| 2017/0295512 A1* | 10/2017 | Rangaswamy | H04W 52/0245 |
| 2017/0309091 A1* | 10/2017 | Cameron | G07C 5/085 |
| 2017/0330397 A1* | 11/2017 | Palmer | G07C 5/0841 |
| 2017/0363720 A1* | 12/2017 | Moriuchi | G01S 13/931 |
| 2018/0006961 A1* | 1/2018 | Guibene | H04W 4/80 |
| 2018/0052463 A1* | 2/2018 | Mays | B60W 60/007 |
| 2018/0144559 A1* | 5/2018 | Hukill | G01S 19/24 |
| 2018/0156770 A1* | 6/2018 | Saez | G01N 33/24 |
| 2018/0197409 A1 | 7/2018 | Youm et al. | |
| 2018/0199237 A1* | 7/2018 | Vare | H04W 28/08 |
| 2018/0259974 A1* | 9/2018 | Lei | H04L 69/14 |
| 2018/0300964 A1* | 10/2018 | Lakshamanan | G06N 3/063 |
| 2018/0332389 A1* | 11/2018 | Ekkizogloy | G10L 15/22 |
| 2018/0339720 A1* | 11/2018 | Singh | G06V 10/751 |
| 2018/0349715 A1* | 12/2018 | Gupta | G01C 21/32 |
| 2018/0350167 A1* | 12/2018 | Ekkizogloy | G08G 1/0968 |
| 2018/0375939 A1* | 12/2018 | Magalhães de Matos | |
| | | | G08G 1/22 |
| 2018/0376305 A1* | 12/2018 | Ramalho de Oliveira | |
| | | | H04W 4/46 |
| 2019/0009790 A1* | 1/2019 | Michalakis | B60W 50/06 |
| 2019/0011927 A1* | 1/2019 | Mou | G06V 20/56 |
| 2019/0012852 A1* | 1/2019 | Dai | G02B 27/0101 |
| 2019/0050718 A1* | 2/2019 | Tickoo | G06N 3/063 |
| 2019/0052597 A1* | 2/2019 | Raghunath | H04L 69/18 |
| 2019/0088135 A1* | 3/2019 | Do | G08G 1/163 |
| 2019/0156680 A1* | 5/2019 | Sarti | H04W 4/44 |
| 2019/0174276 A1* | 6/2019 | Mineiro Ramos de Azevedo | |
| | | | H04W 4/38 |
| 2019/0204893 A1* | 7/2019 | Rotem | G06F 11/3024 |
| 2019/0250626 A1* | 8/2019 | Ghafarianzadeh | G06N 20/00 |
| 2019/0279293 A1* | 9/2019 | Tang | G06N 3/084 |
| 2019/0286133 A1* | 9/2019 | Bielby | B60W 40/10 |
| 2019/0287392 A1* | 9/2019 | Bielby | G08G 1/052 |
| 2019/0325750 A1* | 10/2019 | Bielby | G08G 1/04 |
| 2019/0364403 A1* | 11/2019 | Abari | H04W 4/80 |
| 2020/0017005 A1* | 1/2020 | Salter | B60N 2/3011 |
| 2020/0035099 A1* | 1/2020 | Sivakumar | G08G 1/22 |
| 2020/0090504 A1* | 3/2020 | Kadar | G08G 1/0129 |
| 2020/0118359 A1* | 4/2020 | Sato | H04W 4/38 |
| 2020/0128372 A1* | 4/2020 | Zhang | H04W 4/44 |
| 2020/0349216 A1* | 11/2020 | Das Sarma | G06F 17/16 |
| 2021/0086370 A1* | 3/2021 | Zhang | B25J 9/0084 |

FOREIGN PATENT DOCUMENTS

| | | | | |
|---|---|---|---|---|
| CN | 209085657 U | * | 7/2019 | C25B 1/04 |
| CN | 109639762 B | * | 2/2021 | H04L 41/044 |
| KR | 20200051054 A | * | 5/2020 | B66F 9/24 |
| WO | WO-2011153624 A2 | * | 12/2011 | G01S 17/89 |

\* cited by examiner

VEHICLE DATA OFFLOADING SYSTEMS AND METHODS

TECHNICAL FIELD

Embodiments described herein generally relate to vehicle data offloading systems and methods, and more specifically, systems and methods for offloading vehicle data to optimize transmission of vehicle data by determining whether and when vehicle data should be transmitted from a vehicle. Embodiments described herein further relate to vehicle data offloading systems and methods for storing vehicle data on-board for later transmission in order to optimize data transmission timing and associated cost.

BACKGROUND

Data volume generated and transmitted by vehicles are on the rise drastically. According to forecasts published by Automotive Edge Computing Consortium (AECC), the data volume transmitted between vehicles and the cloud will be expected to be around 100 petabytes per month for the 2025 time frame. AECC General Principle and Vision White Paper, p. 1 (Ver. 1.00, Dec. 1, 2017). Some vehicles already produce a large volume of data points and upload such data points to a cloud every minute. Continuous transmission of data may not provide an option of selecting better transmission settings for data transmission such as transmitting data in a less crowded time, when signal strength is stronger, etc. Data transfer between vehicles and the cloud has already resulted in high expenses and such expenses will likely further rise as data transfer volume continues to rise. Moreover, continued transmission of data may not consider any potential risk of losing data as the transmission settings are poor and the signal strength is not favorable.

In addition to expenses and risks bearing on vehicle data transmission sides, data transfer bandwidth or capacity is a limited resource. It is important to optimize use of the bandwidth in order to avoid transmission interruption and outage. The transmission interruption and outage may have significant impact on many businesses, vehicles, hospitals, emergency situations, and daily lives of many people. Accordingly, there is a need to provide systems and methods for determining an optimal time to offload vehicle data in order to optimize data transmission conditions and maximize the effective and efficient use of the network bandwidth. Also, there is a need to provide systems and methods for controlling data transmission and transfer from vehicles in order to reduce cost associated with data transmission and data transfer.

SUMMARY

In one embodiment, a method for offloading vehicle data from a vehicle includes detecting and capturing a first set of data points with a group of sensors mounted on a vehicle, receiving a second set of data points, processing and analyzing, with a vehicle processor, the first set of data points and the second set of data points, determining whether vehicle data are to be offloaded from the vehicle, or stored in the vehicle, the vehicle data including the first set of data points, the second set of data points, or both, and upon determination that the vehicle data are to be offloaded from the vehicle, determining when to offload the data points from the vehicle.

In another embodiment, a method for controlling transmission of vehicle data includes detecting and capturing vehicle data with a group of sensors mounted on a vehicle, processing and analyzing, with a vehicle processor, the vehicle data, determining whether the vehicle data are required by a cloud server, upon determination that the vehicle data are not required by the cloud server, storing the vehicle data in a storage device of the vehicle, instead of transmitting the vehicle data temporarily, and determining when to offload the stored vehicle data from the vehicle.

In yet another embodiment, a system for controlling transmission of vehicle data includes a group of sensors arranged on-board of a vehicle and operable to detect and capture data points, one or more processors, one or more memory modules communicatively coupled to the one or more processors, and machine readable instructions stored in the one or more memory modules and upon execution by the one or more processors. The machine readable instructions perform at least (i) processing and analyzing data points; (ii) determining whether the data points are required by a cloud server; (iii) upon determination that the data points are not required by the cloud server, temporarily storing the data points in a storage device of the vehicle instead of transmitting the vehicle data; and (iv) determining when to offload the stored data points from the vehicle.

In another embodiment, a system for offloading vehicle data from a vehicle includes a group of sensors arranged on-board of a vehicle and operable to detect and capture data points, one or more processors, one or more memory modules communicatively coupled to the one or more processors, machine readable instructions stored in the one or more memory modules, and a data communication module communicatively connected to the one or more processors. The machine readable instructions are configured to offload the vehicle data upon execution by the one or more processors, performing at least receiving the data points from the group of sensors, processing and analyzing the data points, determining whether the data points are offloaded from the vehicle, or stored in the vehicle, and upon determination that the vehicle data are to be offloaded from the vehicle, determining when to offload from the vehicle.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Connected cars are equipped to communicate with other devices, utilizing connectivity available via wireless and/or cellular networks. Connected cars may be connected to and communicate with the surroundings. Connected cars may communicate via a variety of communication models, including Vehicle to Infrastructure ("V2I"), Vehicle to Vehicle ("V2V"), Vehicle to Cloud ("V2C"), and Vehicle to Everything ("V2X") communication models. A V2I communication model facilitates the communication between a vehicle and one or more infrastructure devices, which may enable the exchange of data generated by a vehicle and information about the infrastructure. A V2V communication model facilitates the communication between vehicles and may allow for the exchange of data generated by surrounding vehicles, including speed and position information of surrounding vehicles. A V2C communication model facilitates the exchange of information between a vehicle and a cloud system. A V2X communication model interconnects all types of vehicles and infrastructure systems with another.

As discussed above, connected cars operate to capture and generate a large amount of data about a vehicle, surrounding vehicles, the environment, etc. Connected cars may seamlessly transmit such data to surrounding vehicles, a cloud server, other infrastructure, etc. and communicate with them via the network. The embodiments disclosed herein include systems and methods for offloading vehicle data to optimize data transmission and accordingly, provide the effective, efficient, fast and cost effective data transfer to external servers, such as edge servers, a central server, and/or any other remote servers. In addition, the embodiments of the systems and methods disclosed herein selectively store vehicle data on-board for transmission later and thus, may provide considerable advantages for use with connected cars in using limited network bandwidth in a more cost efficient manner and transmitting vehicle data in a more secure manner.

In the embodiments disclosed herein, the vehicle data offloading systems and methods may not send all data from a vehicle to a cloud as a default. Instead, the systems and methods described herein classify different data points and determine whether and when to offload such data points, i.e., whether to store the data points locally (on-board) or transfer vehicle data out of the vehicle, such as uploading the data points to a cloud. In some embodiments, the systems and methods may not transmit data unless there is a particular use or need at a cloud server, until network transmission conditions improve, or until transmission becomes cost effective, etc.

Figure 1:
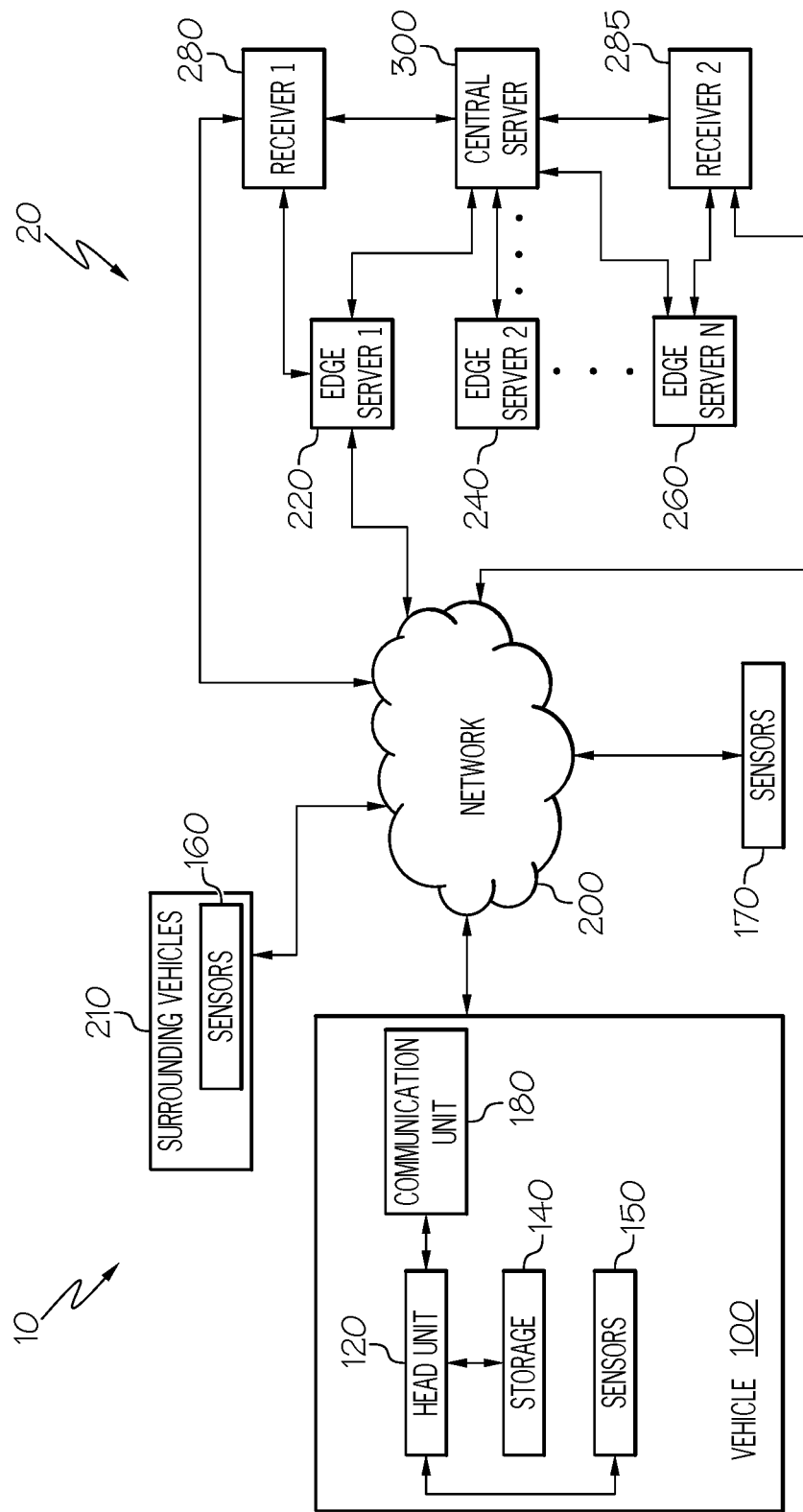
FIG. 1 schematically depicts a connected cars system according to one or more embodiments shown and described herein.

In the embodiments disclosed herein, the vehicle data offloading systems and methods include a control system that intelligently filters data points for particular use cases, or needs. In other words, the control system classifies the data points such that a set of data points are relevant to a particular use or need at a cloud level and determines whether or not to transfer to a cloud. Instead of transmitting all the data points that a vehicle has collected at that point, the systems and methods described herein transmit data points useful for the particular use case or need. The rest of data points that are not useful for, or relevant to another use case or need, are stored on-board until a need arises, or network conditions improve. The various systems and methods for offloading vehicle data to optimize data transmission will be described in more detail herein with specific reference to the corresponding drawings FIG. 1 schematically depicts a connected cars system 10 including a vehicle 100 and a cloud computing system 20. The vehicle 100 includes a head unit 120, storage 140 and various sensors 150. The head unit 120 controls operation of the vehicle 100 based on data points captured and sent from the sensors 150. The storage 140 is coupled to the head unit 120 and stores a set of data points under the control of the head unit 120. The sensors 150 include various types of sensors used in the vehicle 100. In some embodiments, the sensors 150 include one or more cameras, an accelerometer, a proximity sensor, a braking sensor, a motion sensor, etc. However, the sensors 150 used in the vehicle 100 may not be limited thereto and other sensors can be implemented.

In some embodiments, the vehicle 100 also receives data points from other sensors 170 that may be arranged outside of the vehicle 100. For example, the sensors 170 may be arranged on or near buildings such as a parking structure, municipal infrastructure, the surroundings of the vehicle 100, etc. The vehicle 100 may receive data points from the sensors 170 via the network 200. Alternatively, or additionally, a cloud server may receive data from the sensors 170. The network 200 may include a cellular network, a WiFi network, a near field network, or any other available communication network. In other embodiments, the vehicle 100 may receive the data points from surrounding vehicles 210 via a V2V communication channel. Like the sensors 150, various types of sensors such as one or more cameras, an accelerometer, a proximity sensor, a braking sensor, a motion sensor, etc. may be used as the sensors 170.

As shown in FIG. 1, the vehicle 100 includes a communication unit 180 that exchanges data and information between the vehicle 100 and a network 200. As shown in FIG. 1, the vehicle 100 may be connected and communicate with one or more edge servers 220, 240 and 260. The edge servers 220, 240 and 260 may be connected and communicate with a central server 300. The central server 300 may be in communication with receivers 280, 285. Receivers 280 and 285 such as Receiver 1 and Receiver 2 may connect vehicles with the central server 300 as an intermediary.

The central server 300 may represent a cloud server run by a commercial network carriers or other entity (e.g., a municipality), to operate as a node. For instance, a particular city may run a cloud server as a node to receive reports relating to road conditions such as pot holes from vehicles. The central server 300 may operate as such a node. In some embodiments, edge servers 1, 2 . . . N 220, 240 and 260 may represent such cloud nodes for various purposes run by various entities and the central server 300 may be a server behind those nodes which have some logics to run those nodes and the overall vehicle data offloading systems.

Figure 2:
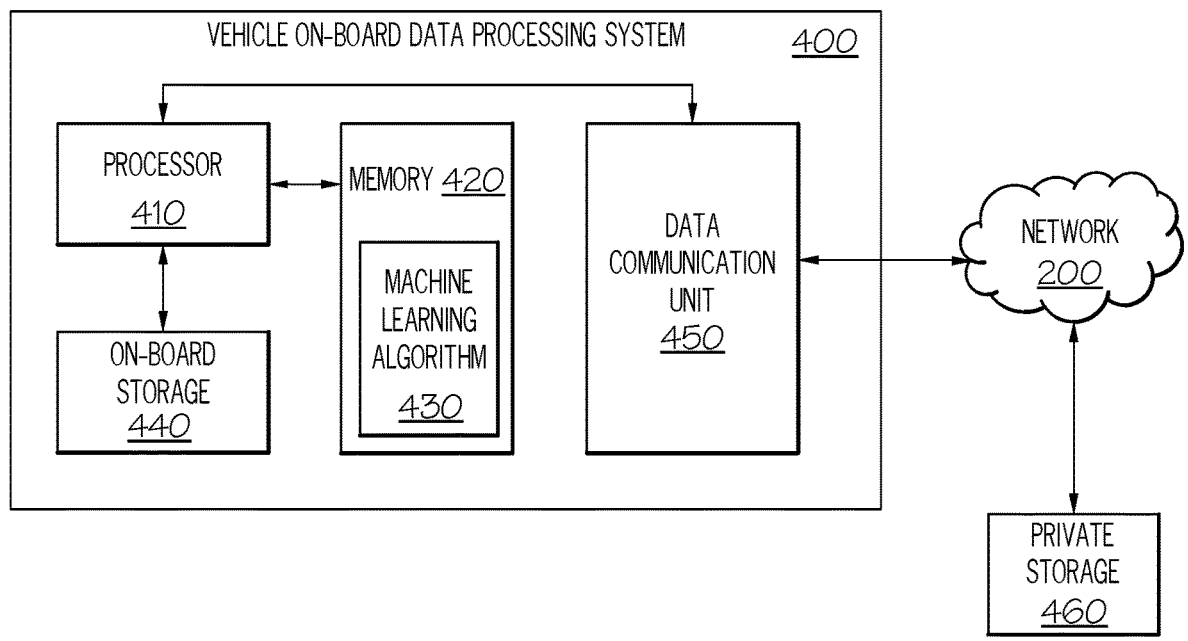
FIG. 2 schematically depicts a block diagram of a vehicle on-board data processing system according to one or more embodiments shown and described herein.

Referring to FIG. 2, the structure and operation of a vehicle on-board data processing system 400 according to one or more embodiments is described. In some embodiments, the vehicle on-board data processing system ("the on-board processing system") 400 may be implemented in the head unit 120 as shown in FIG. 1. In other embodiments, the vehicle on-board processing system 400 may be implemented, independently of and separately from the head unit 120. In some embodiments, the on-board processing system 400 may determine whether to transmit vehicle data at that point, or store on-board at least temporarily for transmission or removal later.

The on-board processing system 400 includes a processor 410, a memory 420, an on-board storage 440 and a data communication unit 450. The processor 410 is communicatively coupled to the memory 420, the on-board storage 440 and the data communication unit 450. The data communication unit 450 is connected to other systems across the network 200. As shown in FIG. 1, the data communication unit 450 is communicatively connected to the various edge servers 220, 240 and 260, the receivers 280, 285 and/or the central server 300. In other embodiments, the data communication unit 450 may be connected to a private storage device 460 via the network 200. For instance, a driver of the vehicle 100 may be offloading vehicle data into a personal hard drive via a home WiFi network.

In some embodiments, the processor 410 may be embedded in a head unit, or a discrete component from the head unit. In some embodiments, the memory 420 stores a predetermined program that includes a machine learning algorithm 430. The processor 410 executes the machine learning algorithm 430 stored in the memory 420 and determines to store data points in the on-board storage 440 if needed. In some embodiments, the on-board storage 440 may be a hard drive, or a solid state storage drive for storing data relating to vehicle operation conditions for a certain standard time frame. If the processor 410 determines a set of data points are to be transmitted over the network 200 (FIG. 1), the processor 410 controls the data communication unit 450 to transmit such set of data points.

In some embodiments, the predetermined program stored in the memory 420 is able to filter data points into at least two groups. One group of data points will be stored in the on-board storage 440 and the other group of data points will be transmitted over the network 200. In some embodiments, the predetermined program may not necessarily involve machine learning.

In some embodiment, the on-board storage 440 may be provided in addition to the storage 140. The on-board storage 440 may provide storage capacity smaller than that of the storage 140. In other embodiments, the on-board storage 440 may be used for relatively short-term purpose and the storage 140 may be used for relatively long-term purpose. Alternatively, one of the on-board storage 400 and the storage 140 may be arranged in the vehicle 100.

In some embodiments, the on-board storage 440 stores data points locally, which facilitates fast access by the processor 410. The processor 410 may use the data points stored locally in the on-board storage 440 in order to provide significantly faster response, as opposed to accessing or downloading data points stored in the central server 300 via the network 200.

Figure 3:
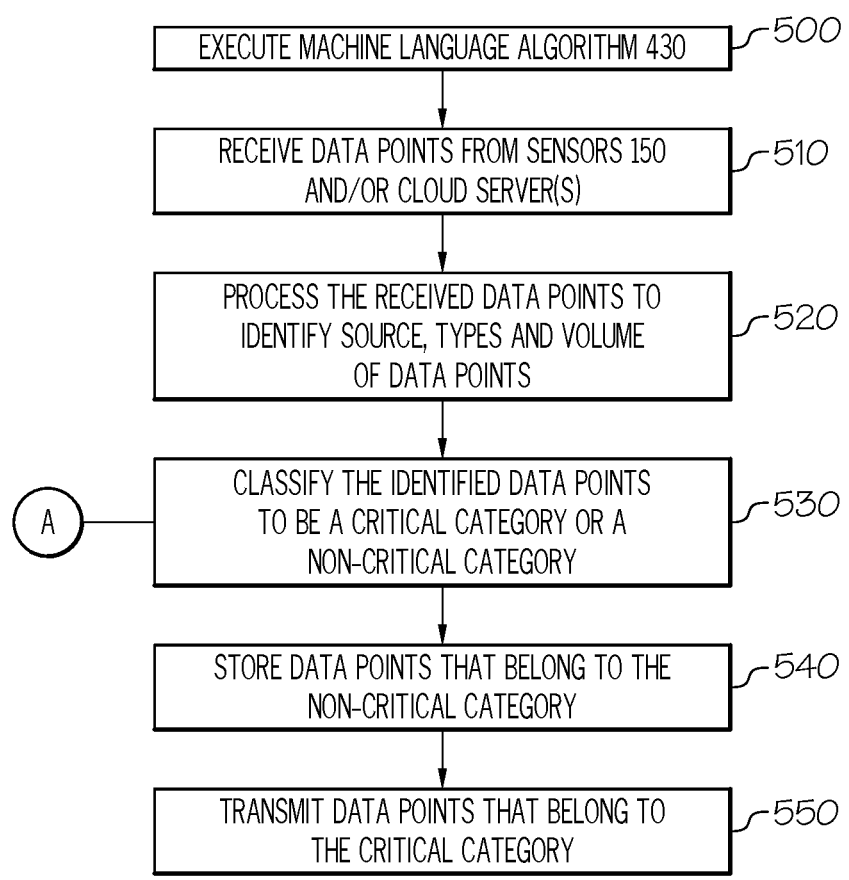
FIG. 3 depicts a flow chart of a method of controlling vehicle data transmission according to one or more embodiments shown and described herein.

Referring to FIG. 3, a flow chart of a method of controlling vehicle data transmission according to one or more embodiments is depicted. The processor 410 executes the machine language algorithm 430 stored in the memory 420. (Step 500). The processor 410 receives data points from the sensors 150 and/or cloud servers. (Step 510). The data points include various data captured and collected by the sensors 150. The data points may include data points that have been just generated by and received from the sensors 150. Alternatively, the data points may include data points that have been periodically received, or historically received. The data points include different types of data and different content of data. For instance, the data points may include engine data, speed data, acceleration data, occupant data, tire data, steering data, video images of the surroundings, road conditions, and vehicles in proximity, etc. Additionally, or alternatively, the data points may include data that have been received from the cloud level. (Step 510). The processor 410 processes the receive data points to identify source of data, data types, and volume of data points. (Step 520). This set of information may be needed to classify the received data points.

As shown in FIG. 3, the processor 410 classifies the identified data points to be either a critical category or a non-critical category. (Step 530). The critical category and the non-critical category will be described further in detail below. In some embodiments, the critical category requires transmission of data and the non-critical category may not require transmission of data until later. Accordingly, the data points that are classified as non-critical may be stored on-board until later. (Step 540). The data points that are classified as critical may be transmitted outside of the vehicle 100 and, for example, be uploaded to a cloud server. (Step 550).

In some embodiments, the critical category and the non-critical category may determine the need and the timing of transmission. Additionally, or alternatively, the critical category and the non-critical category may be associated with the nature and content of data points. Moreover, the critical category and the non-critical category may be associated with the current conditions of the network bandwidth, such as the signal strength, a congested state of the network, network usage cost corresponding to the transmission time, etc. Additionally, or alternatively, the critical category and the non-critical category may be associated with time sensitiveness of data points.

The classification of data points may vary based on need. The machine language algorithm 430 is adapted to learn and process the classification of data points based on need. In some embodiments, the classification of data points may reflect a particular need required by a server, as will be further explained more in conjunction with FIG. 5 below. In this case, the vehicle 100 may inquire a cloud server such as the central server 300 or the edge servers 220, 240 and 260 about whether the particular data points are needed. In this arrangement, the vehicle 100 may depend upon the cloud server for determination of the need or use of the data points. In other embodiments, the vehicle 100 may be enabled to make the determination of the need or use of the data points. In other words, the machine language algorithm 430 may be programmed and configured to have particular use cases. In another embodiment, a cloud server such as the central server 300 may request information relevant to particular use cases to the vehicle 100. For instance, a city cloud server requests all the vehicles driving within the city boundary to transmit road condition information.

Figure 4A:
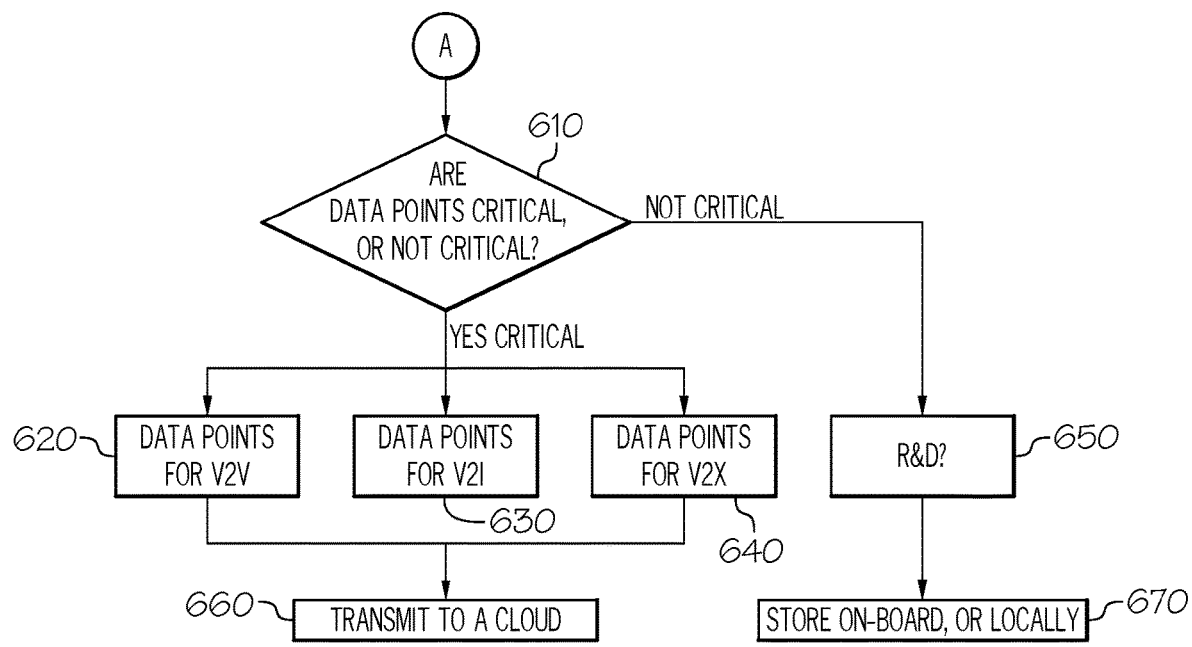
FIG. 4A depicts a flow chart of classifying data points for determining whether to offload vehicle data according to one or more embodiments shown and described herein.

Referring to FIG. 4A, classification of the critical category and non-critical category is further described in detail. FIG. 4A depicts a flow chart of determining the nature of data points for transmission now or later according to one or more embodiments shown and described herein. As shown in FIG. 4A, the processor 410 determines whether the data points are critical or not. (Step 610). In some embodiments, the processor 410 classifies the data points as not critical when the data points relate to research & development (R&D). (Step 650). R&D data points may not require transmission to a cloud at that particular point and may rather be stored on-board or locally. (Step 670). One of the criteria that may determine R&D data as non-critical may relate to a time sensitiveness factor of such data. Another criterion may relate to a factor of whether R&D data may have immediate impact on protection of drivers.

As shown in FIG. 4A, the processor 410 classifies data points as critical. In some embodiments, the critical data points may include data points for vehicle-to-vehicle (V2V) communication 620, vehicle-to-infrastructure (V2I) communication 630, or vehicle-to-everything (V2X) communication 640. Upon classification of the critical data points, such data points may be transmitted to a cloud (e.g., one or more of the edge servers 220, 240, 260, the receivers 280, 285, and the central server 300) (Step 660). The critical data points used in V2V, V2I and V2X communications may have time sensitiveness and/or have significant impact on vehicle occupant and pedestrians. Additionally, the critical data points may be related to crash situations.

Figure 4B:
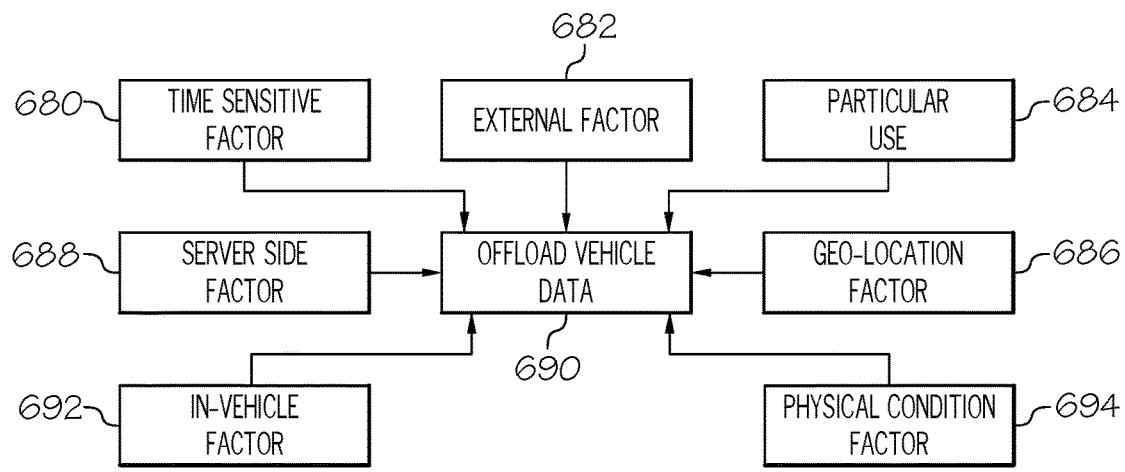
FIG. 4B depicts exemplary relevant factors that determine whether and when to offload data points according to one or more embodiments shown and described herein.

In some embodiments, multiple factors may be relevant to and impact offloading of vehicle data. FIG. 4B depicts some relevant factors. The time sensitive factor 680 determines whether vehicle data needs to be transmitted as the vehicle data is time sensitive. An external factor 682 may determine some urgency caused or triggered by vehicle drivers, such as a crash situation. A particular use factor 684 determines whether a cloud server needs data points at that point of time or not. The particular use factor 684 will be described further in detail below in connection with FIG. 5.

A geo-location factor 686 indicates that the need or use of data points may change as the geo-location of a vehicle changes. For instance, a cloud server requires data while a vehicle is driving within the city limit but once that vehicle moves outside of the city, the cloud server may not need a data point from that vehicle any longer. A server side factor 688 may determine the nature and the amount of data points. For example, if a vehicle driver has been opted in for receiving insurance quotes from a cloud server, he or she is required to provide historical driving data for a predetermined time frame. Drivers who are not opted in for an insurance quote service do not need to have the historical driving data. Thus, the server side factor 688 affects how much data points are transmitted to a cloud server. For instance, non-subscribed drivers may not send any data points relating to the historical driving data to that cloud server.

Referring to FIG. 4B, an in-vehicle factor 692 may affect whether data points should be stored on-board, how long data points should be stored, data points may never be offloaded unless a vehicle is connected to no cost basis network such as WiFi, etc. A physical condition factor 694 may determine the signal strength, network availability, etc. As shown in FIG. 4B, one or more of the listed factors may be relevant to whether and when to offload vehicle data 690. Accordingly, a combination of one or more relevant factors may affect whether or not to offload vehicle data and when to offload vehicle data upon determination that vehicle data is to be offloaded. In other words, one or more of the relevant factors, once such factors are checked, may trigger the determination of whether corresponding data points are to be offloaded or not.

In some embodiments, some factors may have more bearing on whether or not to offload vehicle data and other factors may have more bearing on when to offload vehicle data. For instance, data points may have a particular use for a cloud and the data points are classified to be offloaded from a vehicle. The in-vehicle factor 686 may affect when to offload the data points. By way of example, the in-vehicle factor 686 determines to offload vehicle data only when the WiFi network is detected.

Figure 5:
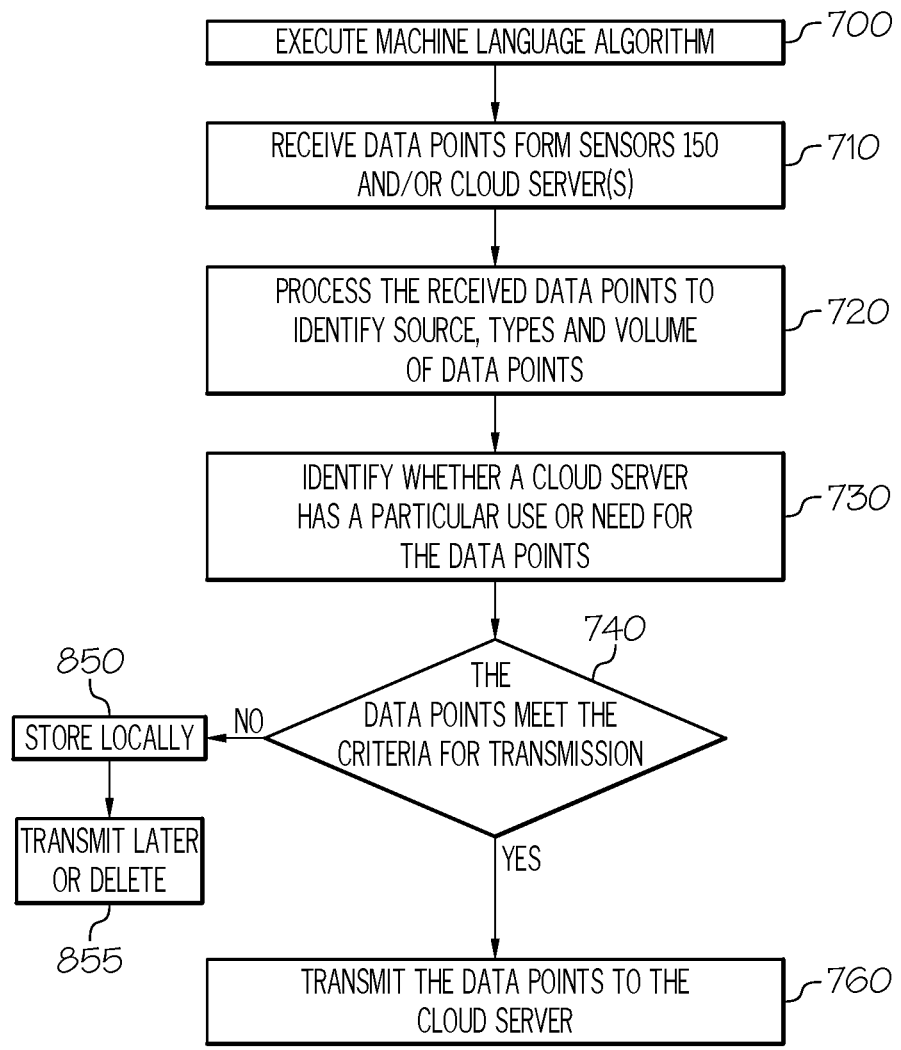
FIG. 5 depicts another flow chart of controlling vehicle data transmission according to one or more embodiments shown and described herein.

FIG. 5 depicts another flow chart of controlling vehicle data transmission according to one or more embodiments shown and described herein. In FIG. 5, the processor 410 as shown in FIG. 2 receives data points from the sensors 150 and processes them to identify the source, type and volume of the received data points, as discussed above in connection with Steps 710 and 720. In the embodiment of FIG. 5, the identified data points are further analyzed to determine whether a cloud server has a particular use or need for the data points. (Step 730). Upon determination that the data points have a particular use at the cloud server, the data points are transmitted to the cloud server (Step 760), which occurs in FIG. 5 after the data points meet the criteria for transmission at Step 740 as described below.

In one embodiment, vehicles may send an inquiry to a cloud server and inquire if the cloud server may have a particular use or need for data points. This embodiment may rely on determinations by the cloud server. In another embodiment, vehicles may store logic for determining whether data points should be transmitted offboard or stored locally using various programs, such as the machine learning language program 430, as shown in FIG. 2. This configuration may reduce server dependency and facilitate vehicle based processing and determination. In yet another embodiment, data points may be determined to have a particular use or need based on a server side push configuration. For instance, a server operated by a particular city requires vehicles driving within the city limit to provide road conditions data and push vehicles to transmit such data points.

In some embodiments, upon determination that the cloud server has a particular use or need, the processor 410 may check whether the data points meet the criteria for uploading or transmitting the data points to the cloud server at that point of time. (Step 740). For instance, a data point that has a particular use but lacks time sensitiveness may determine to not meet the criterial for transmission and be stored locally. In other words, such a data point can be uploaded later when a more cost effective network such as WiFi becomes available, instead of using costly the 4G network. In response to such a determination, the processor 410 may decide to store the data points locally. (Step 750). However, if the data point is time sensitive to the cloud server, then the data point is transmitted to the cloud server. (Step 760).

In a vehicle to infrastructure use case, a vehicle may send a set of data to a municipal entity for an environmental purpose. In that case, information regarding acceleration sensors, yaw rates, etc. may not be useful for the environmental purpose, but such information may be useful for other purposes. Instead of simply sending all the data that a vehicle has collected, the in-vehicle data storage system sends only data useful to the municipal entity.

In a crash use case, vehicle cameras may record the crash scene of a vehicle involved in a minor crash while parked a. The vehicle may be still drivable if the crash does not impact the vehicle's drivability. In that case, instead of uploading the video image data using a costly 4G network, the vehicle may drive back home and use the home WiFi to upload the video image data to a cloud server. A driver of the vehicle can use the data for various purposes such as insurance claims, investigation of the crash scene, etc. The video data captures the accident scene but it may not be considered as time sensitive to be transmitted and uploaded to the cloud server immediately.

In some embodiments, the machine language program stored in the memory 420 and various use cases stored at the cloud server level may be coordinated and arranged by the same entity. For instance, a car manufacturer may load the machine language program in the memory 420 and also install uses cases at the cloud server level such that vehicles and the cloud server operate in coordination to transmit and receive data points and process them. In addition, the same entity can also coordinate with a third party such as insurance companies, law enforcement authorities, or local hospitals to expand use cases and obtain necessary involvement and assistance in transmitting and processing the data points. In some embodiments, vehicle drivers may be asked to subscribe to, or opt in or out for particular use cases before the actual services are provided. By way of example, a vehicle driver may opt in to provide a certain period of time of historical driving data to the cloud server for the purpose of obtaining insurance premium quotes. In this case, a vehicle may store driving data for that certain period of time and once the time requirement is met, transmit the driving data to the cloud server for review by an insurance company using the cost effective network option. Another vehicle that has not opted in may not store historical driving data.

Figure 6:
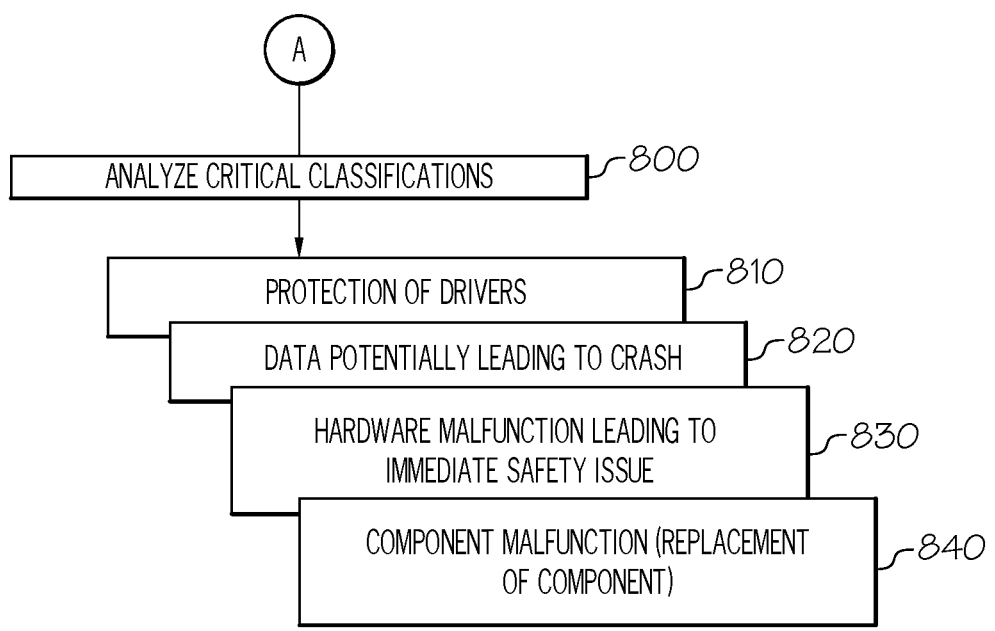
FIG. 6 depicts a hierarchical layer of critical classifications according to one or more embodiments shown and described herein.

FIG. 6 depicts a hierarchical level of critical classifications according to one or more embodiments shown and described herein. The hierarchical level shown in FIG. 6 is by way of example only and necessary modifications are available. As shown in FIG. 6, data points relating to protection of drivers (Step 810) is classified as the highest level. The data points relating to protection of drivers may be offloaded and transmitted to a cloud right away. A next hierarchical level relates to data potentially leading to crash. (Step 820). The data potentially leading to crash may involve the situation where vehicles may have a high probability of running into crash situations but actual crashes may or may not happen. It is necessary and beneficial to have data points relating to such situations. If the vehicle does not have any data points and crashes in fact happen, no data points may be available and it is difficult to investigate or reconstruct crashes. If the data points may be captured and stored, then it may be deleted eventually if no crash takes place. The next hierarchical level relates to hardware malfunction leading to an immediate issue. (Step 830). The last hierarchical level as shown in FIG. 6 relates to component malfunction such as replacement of a component. (Step 840).

In some embodiments, data points that are classified as a lower place of the hierarchical level may be stored on-board or locally to the vehicle 100. Additionally, the data points at the lower hierarchical level may be eventually discarded from storage after a predetermined time elapses. In other embodiments, the data points at the middle level of the hierarchical level may be stored on-board temporarily and transmitted later when network conditions improve, or other options become available. For instance, the data points falling into a category in the middle of the hierarchy may be transmitted when WiFi becomes available. Also, the middle level data points may be offloaded from the vehicle 100 when the network bandwidth becomes less congested, or the signal strength is improved. The middle level data points may be offloaded from the vehicle 100 when bandwidth use avoids peak time surcharges.

In some embodiments, data points at a low hierarchical level may be stored and offloaded only when cost effective data transmission is available. For instance, a camera mounted on a vehicle may record a scene in which a driver encounters a parking violation. Image data points are received and processed by the processor 410. Instead of transmitting the image data points to a cloud server, the processor 410 classifies the image data as non-critical and temporarily stores the data on-board. Once a driver of the vehicle 100 returns to a place having the WiFi network, the processor 410 offloads the image data points from the on-board storage 440 using the WiFi network and sends the data points to a cloud server relating to a government branch, or insurance company.

As described in the above embodiments, a method for offloading vehicle data from a vehicle includes detecting and capturing a first set of data points with a group of sensors mounted on a vehicle, receiving a second set of data points, processing and analyzing, with a vehicle processor, the first set of data points and the second set of data points, determining whether vehicle data are to be offloaded from the vehicle, or stored in the vehicle, the vehicle data including the first set of data points, the second set of data points, or both, and upon determination that the vehicle data are to be offloaded from the vehicle, determining when to offload the data from the vehicle.

In some embodiments, the step of determining whether the vehicle data are to be offloaded further includes determining whether the vehicle data will be needed at a cloud server, determining whether the cloud server requests the vehicle data, or both. In another embodiment, the step of determining whether the vehicle data are to be offloaded further includes upon determination that the vehicle data will be needed at the cloud server, determining whether one or more network conditions improve after elapse of a predetermined time, and upon determination that the one or more network condition improve, offloading the vehicle data. The one or more network conditions include the strength of a network signal, a congested state of a network, cost associated with use of the network, a type of the network, or a combination thereof.

In some embodiments, the step of determining whether the vehicle data are to be offloaded further includes determining whether the vehicle data is time-sensitive. In another embodiment, the step of determining when to offload the vehicle data from the vehicle further includes determining whether a WiFi network is available, and upon determination that no WiFi network is available, withholding offloading of the vehicle data. In yet another embodiment, the step of determining whether the vehicle data are to be offloaded further includes classifying, with a predetermined machine learning program stored in the vehicle, whether the vehicle data is critical, or non-critical, and determining transmission of the vehicle data classified as critical.

In some embodiments, the step of classifying the vehicle data further includes determining whether the vehicle data relate to one of the following categories, such as protection and/or risk mitigation to drivers, determining whether the vehicle data relate to data potentially lead to crash, determining hardware malfunction leading to an immediate issue, and determining component malfunction that is replaceable with another component.

In some embodiments, the step of classifying the vehicle data further includes assigning a different priority weight to the vehicle data based on the critical classification and the non-critical classification, storing the vehicle data classified as non-critical in the vehicle temporarily, and determining whether the stored vehicle data will be deleted over time. In another embodiment, the step of determining when to offload the vehicle data from the vehicle further includes determining a risk of losing the vehicle data upon transmission, and upon determination that the risk of losing the vehicle data exceeds a predetermined threshold, withholding transmission of the vehicle data until later.

In another embodiment, a method for controlling transmission of vehicle data includes detecting and capturing vehicle data with a group of sensors mounted on a vehicle, processing and analyzing, with a vehicle processor, the vehicle data, determining whether the vehicle data are required by a cloud server, upon determination that the vehicle data are not required by the cloud server, storing the vehicle data in a storage device of the vehicle, instead of transmitting the vehicle data temporarily, and determining when to offload the stored vehicle data from the vehicle.

In some embodiments, the method for controlling transmission of vehicle data further includes upon determination that the vehicle data are required by the cloud server, determining whether the vehicle data comply with predetermined criteria, and transmitting the vehicle data to the cloud server when the predetermined criteria are met. In yet another embodiment, the step of storing the vehicle data further includes storing the vehicle data for a later use, and deleting the stored vehicle data upon determination that the stored vehicle data lead to no use. In yet another embodiment, the step of determining when to offload from the vehicle further includes determining whether a WiFi network is available, and upon determination that the WiFi network is available, offloading of the stored vehicle data.

A system for controlling transmission of vehicle data includes a group of sensors arranged on-board of a vehicle and operable to detect and capture data points, one or more processors, one or more memory modules communicatively coupled to the one or more processors, and machine readable instructions stored in the one or more memory modules and upon execution by the one or more processors. The machine readable instructions perform at least (i) processing and analyzing data points, (ii) determining whether the data points are required by a cloud server, (iii) upon determination that the data points are not required by the cloud server, temporarily storing the data points in a storage device of the vehicle instead of transmitting the vehicle data, and (iv) determining when to offload the stored data points from the vehicle.

In another embodiment, the machine readable instructions further perform (i) upon determination that the data points are required by the cloud server, determining whether the data points comply with predetermined criteria, and transmitting the data points to the cloud server when the predetermined criteria are met. In yet another embodiment, the machine readable instruction of storing the vehicle data further perform (i) storing the data points for a later use, and (ii) deleting the stored data points upon determination that the stored data points lead to no use.

In yet another embodiment, the machine readable instructions further perform machine readable instruction of determining when to offload the stored data points from the vehicle further comprises determining whether a WiFi network is available, and upon determination that the WiFi network is available, offloading of the stored data points.

In another embodiment, a system for offloading vehicle data from a vehicle includes a group of sensors arranged on-board of a vehicle and operable to detect and capture data points, one or more processors, one or more memory modules communicatively coupled to the one or more processors, machine readable instructions stored in the one or more memory modules, and a data communication module communicatively connected to the one or more processors. The machine readable instructions are configured to offload the vehicle data upon execution by the one or more processors, performing at least receiving the data points from the group of sensors, processing and analyzing the data points, determining whether the data points are to be offloaded from the vehicle, or stored in the vehicle, and upon determination that the vehicle data are to be offloaded from the vehicle, determining when to offload the data points from the vehicle.

In some embodiments, the machine readable instructions further perform determining whether the cloud server requests the vehicle data, and determining whether the vehicle data is time-sensitive. In another embodiment, the machine readable instructions further perform determining whether a WiFi network is available, and upon determination that no WiFi network is available, withholding offloading of the vehicle data. In yet another embodiment, the machine readable instructions further perform classifying, with a predetermined machine learning program stored in the vehicle, whether the vehicle data is critical, or non-critical, and determining transmission of the vehicle data classified as critical.

In some embodiments, the machine readable instructions further perform temporarily storing the vehicle data classified as non-critical in the vehicle, and determining whether the stored vehicle data will be deleted over time. In another embodiment, the machine readable instructions further perform determining a risk of losing the vehicle data upon transmission, and upon determination that the risk of losing the vehicle data exceeds a predetermined threshold, withholding transmission of the vehicle data until later.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for offloading vehicle data from a vehicle, comprising:
    detecting and capturing a first set of data points with a group of sensors mounted on a vehicle; receiving a second set of data points with a vehicle processor of the vehicle from a remote source; processing and analyzing, with the vehicle processor, the first set of data points and the second set of data points; identifying, with the vehicle processor, a particular use of filtered data including the first set of data points and the second set of data points at a cloud level; filtering vehicle data, with the vehicle processor, including the first set of data points and the second set of data points to classify the vehicle data based on the particular use of the filtered data at the cloud level; determining with the vehicle processor whether the filtered vehicle data is to be offloaded from the vehicle based on the particular use of the filtered vehicle data at the cloud level; and upon determination that the filtered vehicle data is to be offloaded from the vehicle, determining with the vehicle processor a time to offload the filtered vehicle data from the vehicle based on the particular use of the filtered vehicle data at the cloud level.

2. The method of claim 1, further comprising determining whether the filtered vehicle data will be needed at a cloud server, determining whether the cloud server requests the filtered vehicle data, or both, and determining whether the filtered vehicle data is time sensitive based on the particular use of the cloud server.

3. The method of claim 2, further comprising: upon determination that the filtered vehicle data will be needed at the cloud server, determining whether one or more network conditions improve after elapse of a predetermined time; and upon determination that the one or more network condition improve, offloading the filtered vehicle data.

4. The method of claim 3, wherein the one or more network conditions comprise:
the strength of a network signal, a congested state of a network, cost associated with use of the network, a type of the network, or a combination thereof.

5. The method of claim 1, further comprising determining whether the filtered vehicle data is time-sensitive.

6. The method of claim 1, wherein the step of determining to offload the filtered vehicle data from the vehicle comprises: determining whether a WiFi network is available; and upon determination that no WiFi network is available, withholding offloading of the filtered vehicle data.

7. The method of claim 6, wherein the step of classifying whether the filtered vehicle data is critical, or non-critical comprises determining whether the filtered vehicle data relate to one of the following categories: protection of drivers; determining whether the filtered vehicle data relate to data potentially lead to crash; determining hardware malfunction leading to an immediate issue; and determining component malfunction that is replaceable with another component.

8. The method of claim 6, further comprising: storing the filtered vehicle data classified as non-critical in the vehicle temporarily; and determining whether the non-critical data will be deleted over time.

9. The method of claim 1, further comprising:
classifying, with a predetermined machine learning program stored in the vehicle, whether the filtered vehicle data is critical, or non-critical; and determining transmission of the filtered vehicle data classified as critical.

10. The method of claim 1, wherein the step of determining the time to offload the filtered vehicle data from the vehicle comprises: determining a risk of losing the filtered vehicle data upon transmission; and upon determination that the risk of losing the filtered vehicle data exceeds a predetermined threshold, withholding transmission of the filtered vehicle data until later.

11. A system for controlling transmission of vehicle data, comprising: a group of sensors arranged on-board of a vehicle and operable to detect and capture data points; one or more vehicle processors within the vehicle; one or more memory modules communicatively coupled to the one or more vehicle processors; machine readable instructions stored in the one or more memory modules and upon execution by the one or more vehicle processors, performing at least the following: processing and analyzing data points; identifying a particular use of the data points at a cloud server; filtering the data points based on the particular use of the data points at the cloud server; determining whether the filtered data points are required by the cloud server such that the data points are relevant to the particular use at the cloud server; in response to determination that the filtered data points are not required by the cloud server, temporarily storing the filtered data points in a storage device of the vehicle instead of transmitting the vehicle data; and determining a time to offload the stored filtered data points from the vehicle.

12. The system of claim 11, wherein the machine readable instructions further perform: upon determination that the data points are required by the cloud server, determining whether the data points comply with predetermined criteria; and transmitting the data points to the cloud server when the predetermined criteria are met.

13. The system of claim 11, wherein the machine readable instruction of storing the vehicle data further comprises: storing the data points for a later use; and
deleting the stored data points upon determination that the stored data points lead to no use.

14. The system of claim 13, wherein determining the time to offload the stored data points from the vehicle comprises: determining whether a WiFi network is available; and upon determination that the WiFi network is available, offloading of the stored data points.

15. A system for offloading vehicle data from a vehicle, comprising:
a group of sensors arranged on-board of a vehicle and operable to detect and capture data points; one or more vehicle processors within the vehicle; one or more memory modules communicatively coupled to the one or more vehicle processors; machine readable instructions stored in the one or more memory modules and upon execution by the one or more vehicle processors, performing at least the following: receiving the data points from the group of sensors; processing and analyzing the data points; identifying a particular use of the data points at a cloud server; filtering the data points based on the particular use of the data points at the cloud server; determining whether the filtered data points are to be offloaded from the vehicle, or stored in the vehicle based on the particular use of the data points at the cloud server; and upon determination that the filtered data points are to be offloaded from the vehicle, determining a time to offload the filtered data points from the vehicle based on the particular use of the filtered data points at the cloud server; and a data communication module communicatively connected to the one or more vehicle processors and configured to offload the filtered data points at the determined time.

16. The system of claim 15, wherein the machine readable instructions further perform: determining whether the cloud server requests the filtered data points; and determining whether the filtered data points are time-sensitive.

17. The system of claim 15, wherein the machine readable instructions further perform: determining whether a WiFi network is available; and upon determination that no WiFi network is available, withholding offloading of the filtered data points.

18. The system of claim 15, wherein the machine readable instructions further perform: classifying, with a predetermined machine learning program stored in the vehicle, whether the filtered data points are critical or non-critical; and determining transmission of the filtered data points classified as critical.

19. The system of claim 15, wherein the machine readable instructions further perform: temporarily storing the filtered data points classified as non-critical in the vehicle; and determining whether the stored non-critical data will be deleted over time.

20. The system of claim 15, wherein the machine readable instructions further perform: determining a risk of losing the filtered data points upon transmission; and upon determination that the risk of losing the filtered data points exceeds a predetermined threshold, withholding transmission of the filtered data points until later.

21. The system of claim 15, wherein processing and analyzing the data points comprises: identifying a source of the data points, the data point type, and a volume of the data points; and classifying the data points as critical or non-critical based on at least the source of the data points, the data point type, and the volume of the data points, wherein the critical data points are transferred in advance of the non-critical data points.

22. The system of claim 15, wherein: the data points include video image data; processing and analyzing the video image data includes identifying a crash scene; the machine-readable instructions further perform determining a drivable condition of the vehicle; and in response to determining the vehicle is drivable based on the drivable condition of the vehicle, withholding offload of the vehicle data relating to the crash scene until a WiFi network is available to the vehicle.

\* \* \* \* \*

UNITED STATES PATENT AND TRADEMARK OFFICE
CERTIFICATE OF CORRECTION

PATENT NO. : 11,349,903 B2
APPLICATION NO. : 16/175313
DATED : May 31, 2022
INVENTOR(S) : Felipe G. Salles It is certified that error appears in the above-identified patent and that said Letters Patent is hereby corrected as shown below:

On the Title Page

In page 2, Column 1, Item (56), U.S. Patent Documents, cite No. 27, delete "Hui" and insert --Hui et al--, therefor.

In page 2, Column 1, Item (56), U.S. Patent Documents, cite No. 34, delete "Raleigh" and insert --Raleigh et al--, therefor.

Signed and Sealed this
Second Day of August, 2022

Katherine Kelly Vidal
*Director of the United States Patent and Trademark Office*